United States Patent Office 3,325,251
Patented June 13, 1967

3,325,251
PROCESS FOR EVAPORATING AQUEOUS
CAUSTIC SOLUTIONS
Dirk van den Akker, Farmsum, near Delfzijl, Netherlands, assignor to Diamond Alkali Company, Cleveland, Ohio, a corporation of Delaware
No Drawing. Filed Dec. 26, 1963, Ser. No. 333,651
Claims priority, application Netherlands, Dec. 27, 1962, 287,232
2 Claims. (Cl. 23—184)

For reducing corrosion of the surfaces of apparatus used in evaporating commercial caustic soda or caustic potash solutions, it has heretofore been proposed to add sucrose (U.S. Patent No. 2,610,105) or dextrin (British specification 778,226). By this addition, the oxidative attack of the surfaces of the apparatus customarily used appears to be reduced.

It has now been found that oxidative corrosion of metal surfaces used in equipment for evaporating caustic is also reduced to a great degree if, according to this invention, formic acid, oxalic acid, a salt of these acids or a mixture of two or more of the said compounds is used in admixture with the caustic.

These compounds have the advantage that they cannot cause any discoloration of the final product. Further, they are cheap and can be added to the caustic in the form of a solution. It is surprising that these compounds give excellent results since in the article, "Anhydrous NaOH: Today's Technology," by W. L. Badger and F. C. Standiford, Chemical Engineering, February 1954, pp. 183–187, it is said that most organic reducing agents proved ineffective, excepting carbohydrates, in particular sucrose (page 185, left hand column, last paragraph).

In respect to the main object of the present invention, namely attaining a reduction of the corrosive effect of the caustic solutions to be evaporated, the nature of the formic or oxalic acid salts is immaterial. However, it is evident that the use of sodium salts in evaporating caustic soda solutions and the use of potassium salts in evaporating caustic potash solutions has the additional advantage that the reducing agents used do not give any contamination of the resulting hydroxides.

In carrying out the method of the present invention, preferably a substance selected from the group consisting of formic acid, oxalic acid, the salts thereof, and mixtures of such acids and salts, is added in the form of a solution in an amount of 0.005–0.05% by weight, based on the NaOH or KOH content of the solution. However, in certain cases it may be desirable to add larger amounts of the reducing agent, namely in case the caustic soda or caustic potash solution to be evaporated contains considerable quantities of oxidizing substances such as chlorates and/or oxygen.

The expression "caustic" in the sense used herein comprises solutions of sodium hydroxide and potassium hydroxide.

Example 1

In a plant for evaporating a commercial caustic soda solution containing about 50% of sodium hydroxide and comprising an evaporator having an inner wall consisting of a commercial nickel alloy, normally employed for this purpose, 0.038% by weight of sodium formate, based on the NaOH content of the solution, was added to the solution to be evaporated. The nickel content of the resulting sodium hydroxide was determined three times a day on 16 successive days; in 42 out of the 48 determinations the nickel content was found to be between 0.3 and 0.4 mg./kg., and in the remaining six determinations between 0.4 and 0.5 mg./kg., which is indicative of the low degree of corrosion of the apparatus used. Without the addition of formate to the caustic soda solution, the nickel content of the anhydrous caustic obtained varied from 1.5 to 5.0 mg./kg. in the same evaporating equipment.

Example 2

The same results, to wit a nickel content between 0.3 and 0.5 mg./kg. anhydrous sodium hydroxide, were found to obtain in adding a mixture of 0.013% by weight of sodium formate and 0.013% by weight of sodium oxalate, based on the final product.

What is claimed is:
1. In the method of dehydrating an aqueous caustic solution selected from the group consisting of sodium and potassium hydroxide solutions, by evaporating water from said solution while in contact with metal surfaces containing nickel as a major component and susceptible to oxidative attack by oxidizing impurities contained in said solution during the dehydration thereof, the improvement which comprises adding to said solution prior to the dehydration thereof at least one compound selected from the group consisting of formic acid, oxalic acid, and sodium and potassium salts thereof, thereby to reduce oxidative attack of said surfaces in the subsequent dehydration of said solution.

2. The method according to claim 1 wherein said compound selected from said group is added to said solution to be subjected to dehydration, in an amount from about 0.005 to about 0.05% by weight based on the anhydrous caustic content of said solution.

References Cited

Jacobson, Encyclopedia of Chemical Reaction, vol. 6, Reinhold, 1956, p. 313.

OSCAR R. VERTIZ, *Primary Examiner.*

J. J. BROWN, *Examiner.*

E. J. MEROS, *Assistant Examiner.*